3,037,866
METHOD FOR FORMING FLAVORING ESSENCES FROM PLANT PRODUCTS
Russell W. Evans, 936 Harrison St., Denver, Colo.
No Drawing. Filed Apr. 8, 1960, Ser. No. 20,832
8 Claims. (Cl. 99—140)

This invention relates to a method for forming flavoring essences from plant products such as fruits and vegetables for producing flavors for use in flavoring prepared foods and ingredients of foods.

The invention is more particularly directed to the production of a flavoring extract of extreme potency having the natural flavors and aromas of an onion.

It has been heretofore extremely difficult to produce a genuine onion essence directly from natural onions, either fresh or dehydrated, and as a result the majority, if not all, the onion flavors on the market are synthetic in nature.

The principal object of this invention is to provide a process and method for producing a stable flavoring compound which will have the true natural onion flavor and aromas and to produce this stable compound from natural onions without the necessity for the use of synthetic flavors or essences of any kind.

A further object is to provide a natural onion essence or flavoring compound which will retain its original flavoring qualities for relatively long periods of time without becoming rancid and which will avoid solidifying, thickening and increasing concentration due to evaporation and oxidation.

Briefly, I have found that the combination of sulphur, vegetable oil and iodine in a true essence produces a stable compound which will keep for an indefinite period without becoming rancid or losing its character or value. Since the natural juices of onions contain the necessary sulphur, the addition of a stable edible oil and iodine thereto will produce a permanent, concentrate of the natural flavors and aromas of the onion which can be effectively and efficiently employed in the production of delectable food products in which it is desired to retain the flavor of natural fresh onions.

One method of combining the oil and iodine with the onion juices contemplates the pre-preparation of what will be herein designated as a stock solution, employing this stock solution to produce batches of a working solution which are used to extract the natural flavoring oils and cells from batches of onion pulp to produce a concentrated, stable, marketable, flavoring essence of onion.

The stock solution is prepared by thoroughly intermixing iodine crystals with a stable vegetable oil, preferably oil of sesame, in the proportion of from 5 to 15 grams, preferably 10 grams, of iodine crystals to 100 cubic centimeters of the oil. The stock solution as above prepared is retained for subsequent use in the preparation of batches of working solutions for use on batches of onions as the process proceeds.

Each batch of working solution is individually prepared by adding minute quantities of the stock solution to a predetermined quantity of an edible oil sufficient to carry out the process on a given batch of onion pulp. In actual practise, a very satisfactory working solution comprises a highly refined edible oil, such as cotton seed oil, containing from two to ten drops of the stock solution, to each 75 cubic centimeters of the latter oil. The oil is thoroughly stirred as each drop of stock solution is added until the oil assumes a very light cloudy green color which is usually attained after the third or fourth drop is added.

The batch of onions from which the flavor is to be extracted are freshly cut, shredded or chopped to relatively small pieces, say about 8 to 10 mesh, to expose the juice cells and produce an onion pulp.

The above described working solution is added to and intermixed with the freshly prepared onion pulp in the proportion of substantially 75 cubic centimeters of working solution to each quart of pulp. The onion pulp is placed into the above described working solution directly from the shredding and chopping step so as to reduce oxidation of the juice to an extreme minimum to retain the natural characteristics of the juice.

The mixture of pulp and working solution is allowed to set in glass or glass lined containers for a period of from 12 to 24 hours at a relatively low room temperature of say 50° F. During the setting period, the oil enters the cells of the onion pieces liberating the essences into the fluids. At the termination of the setting period, the solid pulp is separated from the fluid oil preferably in a centrifugal extractor or similar device and the pulp is discarded. The resulting fluid is now a juice and oil emulsion.

A separation is now made to eliminate the excess water and recover the oil and oil-impregnated water-soluble cellulose and sugars. This may be done by using a conventional funnel separator or by a simple setting and skimming of the emulsion from above the water. The emulsion is now subjected to a dehydration step. This is done without heat in order to prevent any chemical alterations in the essences.

In actual practice, the dehydration has been accomplished very efficiently by spreading the fluid in a thin film over glass sheets and circulating fan-driven air at room temperature over the surface of the fluid film until the fluid becomes clear and all signs of an emulsion are removed. It has been found, the fluid film becomes clear in about one hour under a gentle forced air draft.

The resulting clear liquid is an intermixture of oil, cellulose and syrups with most of the onion essences and flavor characteristics and aromas entrapped in the heavier gravity cellulose and syrups. The intermixture is now allowed to settle after which the oil is decanted therefrom and is replaced by a quantity of calcium chloride equal in volume to the volume of the remaining cellulose and syrup. The mixture of calcium chloride, cellulose, sugars and syrups is now thoroughly stirred to form a thick pasty mass with the calcium chloride in intimate contact with the moisture content. The decanted oil is now returned to the pasty mass and the entire batch is allowed to set for a period of from 10 to 12 hours, at 50° F. The deliquescent calcium chloride draws out the remaining moisture from the syrup and cellulose mixture and liberates the flavoring essences so that they may freely combine with the oil.

After the latter setting period, the flavor-containing oil is again decanted and the residual sludge is discarded. Sufficient ammonium chloride is now added to the oil to neutralize any acidity therein. The final product, after a final setting period of at least 5 hours at room temperature, is a stable onion-flavored oil containing all of the flavors and essences of the natural onion.

If a still more concentrated product is desired, the oil emulsion separated from the oil-impregnated cellulose and sugars before the hydration step may be reused in a second batch of onion pulp in place of new oil so as to repeat the run through the process and increase the flavor concentration therein.

It will be noted that the sulphides of the onion enter into a chemical combination with the iodine in the oil so that the onion characteristics are permanently preserved. In other words, the stability of the product depends upon the combination of the sulphur with an iodized oil. In the above described form of the process, the iodine is added to the stock solution for convenience of use and for accurate distribution. It could, of course, be added at an intermediate point in the process.

For instance, the working solution could be pure cotton seed oil or sesame oil which would be intermixed with the onion pulp and carried through all of the above described steps. The iodine could then be added in the form of iodine trichloride after the addition of the ammonium chloride. The final result would be an oil containing the flavoring essences combined with stabilizing sulphur and iodine as in the first described form of the process.

In the above description, reference has been had to fresh full-bodied onions. The same process applies to dehydrated onions. In the latter case, however, the dehydrated onion pulps must be intermixed with a substantially equal volume of freshly cut onion pulp so that the juices of the latter can rehydrate the pulp of the former so as to liberate the essences into the oil and juices.

While in the above outlines of preferred methods of carrying out the process, the halogens, iodine and chlorine have been referred to for use in the stabilization and concentration of food essences, it has been found that other halogens, such as florine, bromine, etc., have similar effects and reactions. The principal feature resides in the use of a halogen for preparing and stabilizing concentrated food essences.

While preferred forms of the invention have been described in some detail together with the theories which it is believed to best explain its success, it is to be understood that the invention is not limited to the precise procedure described nor is dependent upon the accuracy of the theories which have been advanced. On the contrary, the invention is not to be regarded as limited except insofar as such limitations are included within the terms of the accompanying claims in which it is the intention to claim all novelty inherent in the invention as broadly as is permissible in view of the prior art.

Having thus described the invention what is claimed and desired secured by Letters Patent is:

1. A method for forming a liquid flavoring essence from onions comprising: comminuting the product; immersing the comminuted product in a mixture of a halogen compound and a vegetable oil for a period of hours; separating the product from the oil; thence dehydrating the oil at substantially room temperature to produce the liquid flavoring essence.

2. A method for forming a flavoring essence as described in claim 1 in which the halogen compound comprises an iodine compound which is intermixed with the oil and which chemically combines with natural sulphur in the product to stabilize the essence.

3. A method for forming a flavoring compound as described in claim 2 including the addition of calcium chloride to withdraw the moisture from the syrup and cellulose mixture and to liberate the essences so that they may combine with the oil.

4. A method for forming a flavoring compound as described in claim 2 including the addition of ammonium chloride to the resulting compound to neutralize acidity.

5. A method for producing an organic liquid flavoring compound from onions comprising: intermixing iodine with a vegetable oil to form a working solution; comminuting said product; intermixing the comminuted product with the working solution and allowing a setting period; separating the comminuted plant product from the working solution; and dehydrating the latter solution without the use of heat liquid to produce the flavoring compound.

6. A method for producing an onion essence from natural onions comprising: intermixing iodine with a vegetable oil to form a stock solution; intermixing a quantity of said stock solution with additional vegetable oil to form a working solution; comminuting said onions; intermixing the comminuted onions with the working solution and allowing a setting period to produce a mixture of juices and oil; separating the comminuted onions from the mixture; dehydrating the mixture at room temperature and adding deliquescent compound to the remaining solution to withdraw water therefrom and to liberate the onion essence.

7. A method for producing an onion essence as described in claim 6 in which excess acid in the solution is neutralized after the addition of the deliquescent compound.

8. A method for producing an onion essence as described in claim 7 in which the deliquescent compound comprises calcium chloride.

References Cited in the file of this patent
UNITED STATES PATENTS

| | | |
|---|---|---|
| 1,056,649 | Ellis | Mar. 18, 1913 |
| 1,956,362 | Rolle | Apr. 24, 1934 |
| 2,715,582 | Marks et al. | Aug. 16, 1955 |

OTHER REFERENCES

"In-Package Desiccation," by Hendel et al., Modern Packaging, January 1955, pp. 121–124.